(12) United States Patent
Roedler et al.

(10) Patent No.: US 12,374,366 B2
(45) Date of Patent: Jul. 29, 2025

(54) METHOD AND SYSTEM FOR AUTOMATICALLY ANNOTATING SENSOR DATA

(71) Applicant: dSPACE GmbH, Paderborn (DE)

(72) Inventors: Daniel Roedler, Karlsruhe (DE); Simon Romanski, Karlsruhe (DE); Fabian Both, Karlsruhe (DE); Maximilian Link, Karlsruhe (DE)

(73) Assignee: DSPACE GMBH, Paderborn (DE)

( * ) Notice: Subject to any disclaimer, the term of this patent is extended or adjusted under 35 U.S.C. 154(b) by 340 days.

(21) Appl. No.: 17/946,073

(22) Filed: Sep. 16, 2022

(65) Prior Publication Data
US 2023/0094252 A1 Mar. 30, 2023

(30) Foreign Application Priority Data
Sep. 17, 2021 (DE) .......................... 102021124103.0

(51) Int. Cl.
*G11B 20/10* (2006.01)
(52) U.S. Cl.
CPC .............................. *G11B 20/10527* (2013.01)
(58) Field of Classification Search
None
See application file for complete search history.

(56) References Cited

U.S. PATENT DOCUMENTS

| 2018/0253660 A1* | 9/2018 | Liu ....................... G06F 16/285 |
| 2021/0035015 A1* | 2/2021 | Edgar ................... G06F 18/211 |
| 2021/0326719 A1* | 10/2021 | Mahmud ................ G06N 20/00 |

OTHER PUBLICATIONS

Ding Xinghao et al: "Vehicle Type Recognition From Surveillance Data Based on Deep Active Learning", IEEE Transactions on Vehicular Technology, IEEE, USA, vol. 69, No. 3, Jan. 16, 2020 (Jan. 16, 2020), pp. 2477-2486, XP011778125, ISSN: 0018-9545, DOI: 10.1109/TVT.2020.2967077 [retrieved on Mar. 13, 2020] abstract, p. 2477-p. 2483, figure 1.

(Continued)

*Primary Examiner* — Walter F Briney, III
(74) *Attorney, Agent, or Firm* — LEYDIG, VOIT & MAYER, LTD.

(57) ABSTRACT

A computer-implemented method for automatically annotating frames of sensor data includes: receiving the frames of sensor data; grouping the frames into a plurality of packets based on at least one condition attribute, wherein the at least one condition attribute describes at least one environment condition that existed while a respective frame of sensor data was being recorded; annotating frames from a first packet using a neural network, wherein the annotating comprises assigning at least one data point to each frame, wherein the first packet comprises frames for which the at least one condition attribute is in a selected value range; selecting a first sample of one or more frames from the first packet and determining a quality measure for data points of the first sample; and ascertaining that the quality measure for the first sample is below a predefined threshold.

10 Claims, 3 Drawing Sheets

(56) References Cited

OTHER PUBLICATIONS

Priyanshu Makhiyaviya: "Audio Analytics for autonomous cars, Machine Learning, Deep Learning Audio Analytics—an important technology for autonomous cars", Mar. 17, 2021 (Mar. 17, 2021), pp. 1-8, XP093010656, Retrieved from the Internet: URL:https://volansys.com/blog/audio-analytics-an-important-technology-for-autonomous-cars/, [retrieved on Dec. 23, 2022] p. 1-p. 6.

Khadija Shaheen et al: "Continual Learning for Real-World Autonomous Systems: Algorithms, Challenges and Frameworks", arxiv.org, Cornell University Library, 201 Olin Library Cornell University Ithaca, NY 14853, May 26, 2021 (May 26, 2021), XP081969593, abstract, p. 3-p. 23.

\* cited by examiner

Fig. 3 highway, day, dry     highway, day, wet     highway, night, wet

METHOD AND SYSTEM FOR AUTOMATICALLY ANNOTATING SENSOR DATA

CROSS-REFERENCE TO PRIOR APPLICATIONS

This application claims benefit to German Patent Application No. DE 102021124103.0, filed on Sep. 17, 2021.

FIELD

The present invention relates to methods and computer systems for automatically annotating frames of sensor data, in particular frames of data from an image-capture sensor.

BACKGROUND

Autonomous driving promises unprecedented levels of comfort and security in day-to-day traffic. Despite enormous investments by diverse companies, existing approaches are applicable only in limited circumstances and/or provide only a subset of truly autonomous behavior. One reason for this is the lack of a sufficient quantity and diversity of driving scenarios available. Thus, further advances are limited by the need for enormous quantities of sufficiently diverse training data as well as validation data (i.e., independent ground truth data). The preparation of training data generally requires many different driving scenarios to be recorded by a vehicle equipped with a set of sensors, in particular image-capture sensors, such as one or more cameras, a LiDAR sensor, and/or a radar sensor. Before these recorded scenarios are used as training data, they need to be annotated.

This is often performed by annotation providers who receive the recorded sensor data and split it up into work packets for a plurality of human workers, also called labelers. The exact annotations needed (e.g., the classes of objects to distinguish) depend on each project and are described in a detailed labeling specification. The customer delivers the raw data to the annotation provider and expects high-quality annotations according to their specifications in a short timeframe. The number of labelers needed for finishing the annotation project increases as the quantity of delivered data increases, and also increases as the time frame for a fixed amount of data decreases. For this reason, bigger annotation projects that would deliver, for example, sufficient ground truth data for validating an autonomous vehicle may not be feasible with human labor alone but require an automation of the annotation process.

Automation approaches use neural networks for labeling the recorded sensor data. An initial set of the received data is labeled manually and then used to train dedicated neural networks. Once sufficiently trained, the dedicated neural networks can annotate the bulk of the recorded image-capture sensor data. Compared to a purely manual approach, this reduces the effort considerably. However, maintaining a high annotation quality still requires time-intensive quality checks by humans. As the quality assurance process still needs to be applied to all annotations, there is a linear relationship between project volume and the amount of work needed to fulfill project requirements.

SUMMARY

In an exemplary embodiment, the present invention provides a computer-implemented method for automatically annotating frames of sensor data. The method includes: receiving the frames of sensor data; grouping the frames into a plurality of packets based on at least one condition attribute, wherein the at least one condition attribute describes at least one environment condition that existed while a respective frame of sensor data was being recorded; annotating frames from a first packet using a neural network, wherein the annotating comprises assigning at least one data point to each frame, wherein the first packet comprises frames for which the at least one condition attribute is in a selected value range; selecting a first sample of one or more frames from the first packet and determining a quality measure for data points of the first sample; and ascertaining that the quality measure for the first sample is below a predefined threshold. Based on having ascertained that the quality measure for the first sample is below the predefined threshold, the method further includes: receiving corrected annotations for frames in the first sample; retraining the neural network based on the frames in the first sample; selecting a second sample of one or more frames from the frames of the first packet that were not included in the first sample; annotating frames of the second sample using the retrained neural network and determining a quality measure for data points of the second sample; ascertaining that the quality measure for the second sample is above the predefined threshold; annotating the remaining frames of the first packet using the retrained neural network; and exporting the annotated frames of the first packet.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide improved methods for automatically annotating sensor data, in particular data from image-capture sensors. Advantages include achieving a high annotation quality with a reduced number of manual quality checks.

Exemplary embodiments of the present invention provide methods and computer systems for automatically annotating frames of sensor data, in particular video frames or LiDAR point clouds.

In a first aspect of the invention, a computer-implemented method for automatically annotating frames of sensor data is provided; the method comprises:

Receiving a plurality of frames of sensor data,

Grouping the frames into a plurality of packets on the basis of at least one condition attribute, wherein the condition attribute describes an environment condition that was existent while the frame of sensor data was being recorded, Annotating the frames from a first packet using a neural network, wherein annotating comprises assigning at least one data point to each frame, wherein the first packet comprises frames for which the at least one condition attribute is in a selected value range, Selecting a first sample of one or more frames from the first packet and determining a quality measure for the data points, wherein when the computer ascertains that the quality measure for at least one frame in the first sample is below a predefined threshold, the method further comprises:

Receiving corrected annotations for the frames in the first sample,

Retraining the neural network on the basis of the frames in the first sample,

Selecting a second sample of one or more frames from the frames of the first packet that were not included in the first sample, Annotating the frames of the second sample using the retrained neural network Receiving a quality measure for the data points and ensuring that the quality measure for the frames in the second sample is above a predefined threshold, Annotating the remaining frames of the first packet using the retrained neural network, and Exporting the annotated frames of the first packet.

The host computer may be realized as a single standard computer comprising a processor, such as a general-purpose microprocessor, a display device, and an input device. Alternatively, the host computer system may comprise one or more servers comprising a plurality of processing elements, the servers being connected, via a network, to a client comprising a display device and an input device. Thus, the annotation software may be executed partially or completely on a remote server, such as in a computer cloud, so that only a graphical user interface needs to be executed locally. Exporting the annotated frames may include, for example, saving the frames to an external data carrier and/or converting or merging them into a predetermined data format.

By grouping frames of sensor data on the basis of a condition attribute describing environment conditions existent at the time of the recording, possible correlations between the condition attribute and the accuracy of the annotation can be taken into account. An environment condition that was existent while the frame was being recorded may have an influence on the accuracy of the annotations. For annotations comprising multiple data points, the influence may be different depending on the data point. When the sensor data comprises camera images captured at night, the position and/or class of an object may be more difficult to determine. However, an attribute of a car such as the state of a light indicator may be more easily discerned than in broad daylight. The invention makes it possible to identify environment conditions that negatively impact the annotation accuracy, and to improve the neural network under those conditions by selective retraining. Since retraining is targeted for problematic environment conditions, the overall training effort is reduced. This further reduces the computing power required for training and thus also the energy consumption.

The term neural network may refer to a single neural network, a combination of different neural networks according to a predetermined architecture, or any type of machine learning-based technology that learns from data samples in a supervised, semi-supervised, or unsupervised way. For different data points, different neural networks may be used; the object position and/or classification may be determined using a first neural network, whereas attributes of the object may be determined using at least one further neural network.

Because manual work is used only to produce training, test, and/or validation data for systematically improving the neural network or another machine learning-based automation component for annotating the frames, the effort required for large annotation projects can be considerably reduced. Typically, after a number of iterations of retraining the neural network, the quality level is sufficient for delivering automation results, i.e., annotations by the neural network, without any further manual checks. The method according to the invention further reduces the necessary manual effort and time by focusing the retraining on those conditions under which the annotation quality is still lacking.

As a quality measure, an area overlap between an automatically created bounding box and a bounding box created manually as part of quality control can be used, for example. A maximum number and/or a maximum proportion of incorrectly assigned object classes and/or false positives and/or false negatives may also be required. The quality measure would then be below the predefined threshold, for example, if the bounding boxes have too low an overlap. As a quality measure, it may also be specified that a maximum predetermined number of false positives or falsely recognized objects and/or false negatives or falsely unrecognized objects may occur in one sample from a predetermined number of frames. The quality measure would then be below the predefined threshold, for example, if the maximum permitted number of unrecognized objects in the sample was exceeded.

The steps of selecting a second sample of frames from the first packet and annotating remaining frames of the first packet with the retrained network may be interchanged. For instance, all remaining frames of the first packet may be annotated using the retrained network before a second sample is selected. Only annotating the frames of the second sample using the retrained network and deferring annotating further frames until sufficient annotation quality has been ensured reduces the computation load in cases where the neural network has to be retrained more than once, thus speeding up the retraining and annotation process.

In an embodiment, the received sensor data comprises frames from at least one image-capture sensor, such as one or more cameras, a LiDAR sensor, and/or a radar sensor. The received sensor data may also comprise additional sensor data recorded concurrently with the data from the image-capture sensor, such as a global positioning system (GPS) position, an acceleration of the vehicle, or data from a rain sensor. For image frames, i.e., frames with image data or frames of data from an image-capture sensor, the condition attribute is preferably a geographic location, a time of day, a weather condition, a visibility condition, a road type, a distance to an object, and/or a traffic density. The distance to an object may be a distance to the closest object, a distance to a farthest object, or an average distance to a plurality of objects recognized in the frame; by taking the distance from an object into account as an environment condition at the time of the recording, the influence on the object detection and/or classification performance of a neural network can be quantified. For an image frame, the at least one data point preferably comprises a position of an object, a class of an object, a position of an edge of a bounding box, a degree of overlapping of an object by other objects, a correlation of an object in the image frame with an object in a preceding or subsequent image frame (as a result of tracking the object), and/or an activation of a light indicator, such as a turn signal or a brake light. The number of data points may depend on the content of the image frame, for instance many cars and pedestrians in a city scene with a corresponding number of object positions, object classifications, and possible attributes for the corresponding object class.

In an embodiment, the received sensor data comprise audio frames recorded by at least one microphone. For audio frames, i.e., frames of audio data, the condition attribute is preferably a geographic location, a gender and/or an age of a speaker who was captured, a room size, and/or a measure of background noise. For audio frames, the at least one data point comprises one or more words of text recognized from the audio frame. Words may be recognized from a plurality of subsequent audio frames, so one data point may be derived from a plurality of audio frames. The difficulty of recognizing speech may depend, for example, on the frequency range a speaker produces, the presence of reverb or echo from the room, and/or a level of background noise present.

Preferably, the step of receiving a plurality of frames of sensor data comprises a step of preprocessing the frames, wherein at least one of the condition attributes for a frame is determined by a dedicated neural network on the basis of the frame and/or at least one of the condition attributes for a frame is determined on the basis of additional sensor data that was recorded concurrently with the frames. The additional sensor data may be combined and/or used for queries to various services that provide, for example, the weather conditions or a type of lighting conditions based on time and geographic location.

In an embodiment, the first sample comprises two or more frames selected from the first packet. Preferably, as soon as the computer ascertains that the quality measure for the first sample is below the predetermined threshold, no further calculations are performed on the frames from the first packet until corrected annotations are received for the frames in the first sample. Additional frames from the first group may be annotated manually and added to the frames of the first sample, so that a bigger dataset can be used for retraining the model. By deferring further processing until the neural network has been retrained, significant amounts of time and energy are saved.

Preferably, the choice of frames for the first sample depends on the data points for which the quality measure is to be determined, in particular a random choice of single frames for object detection and/or a random choice of batches of consecutive frames for object tracking. By applying a smart sampling strategy, the improvement achievable by retraining is maximized. An object detector such as a traffic sign classifier benefits from training data with high variance, so a random choice of single frames is a useful first sample. On the other hand, a tracking component benefits from sequential data as only then can the same object be tracked between consecutive frames. In this case, a series of consecutive frames—always 10 for example—for a variety of objects would be expediently selected at random as a sample. As an example, a smart sampling system would collect frames 10 to 20 as well as frames 100 to 110 and 235 to 245 for the first sample when determining a quality measure for a tracking component. In order to obtain a high variance in the sample, the software component performing the sampling may impose a minimum interval between samples to ensure that different frames were captured under different environment conditions. Additionally or alternatively, one or more attributes may be taken into account when sampling. For instance, when choosing a sample for quantifying the capabilities of the object detector at night, different environments, such as city, country, or highway, may be imposed. The random choice would then be performed between all samples fulfilling the imposed criterion.

In an embodiment, the steps of selecting a current sample of one or more frames from the first packet and determining a quality measure for the data points, as well as receiving corrected annotations for the frames in the current sample, and retraining the neural network on the basis of the frames in the current sample, are repeated until the quality measure for the frames in the current sample is above a predefined threshold or the first packet does not comprise any remaining frames. Advantageously, the neural network is retrained until environment conditions adverse to the annotation process can also be properly handled.

Preferably, annotating sensor data and recording sensor data are performed alternately or simultaneously, and if it is ascertained that the quality measure for at least one frame in the first sample is below a predefined threshold, the computer requests the recording of additional sensor data for which the at least one condition attribute is in the selected value range of the first packet. A value range of the condition attribute can be chosen by equipping a test vehicle with an automated recording device that executes a selection program that triggers a recording as soon as a predefined recording condition is fulfilled, or by asking a test driver to drive under specific conditions, e.g., at night. Thus, new data is recorded at least primarily for those environment conditions for which the neural network needs further training. By carefully choosing training data, the improvement per training effort is maximized. Thus, the computing power required for training and also the energy consumption are reduced.

In a second aspect of the invention, a computer-implemented method for automatically annotating sensor data comprising frames, such as video or audio frames, is provided. At least one processor of a host computer performs the method, the method comprising:

a) Receiving a plurality of frames of sensor data, b) Grouping the frames in packets on the basis of at least one condition attribute, wherein the condition attribute describes an environment condition that was existent while the frame of sensor data was being recorded, c) Annotating the frames from a first packet using a neural network, wherein annotating comprises assigning at least one data point to each frame, wherein the first packet comprises frames for which the at least one condition attribute is in a selected value range, d) Selecting a first sample of one or more frames from the first packet and determining a quality measure for the data points, e) Ascertaining that the quality measure for at least one frame in the first sample is below a predefined threshold, f) Receiving corrected annotations for the frames in the first sample and retraining the neural network using the frames in the first sample, g) Annotating at least one of the remaining frames of the first packet using the retrained neural network, h) Selecting a second sample of one or more frames out of the at least one annotated remaining frame of the first packet and determining a quality measure for the data points, i) Ascertaining that the quality measure for the frames in the second sample is above a predefined threshold,
j) Annotating the remaining frames from the first packet using the retrained neural network, and
k) Exporting the annotated frames.

One aspect of the invention also concerns a non-volatile computer-readable medium containing instructions that, when executed by a microprocessor of a computer system, cause the computer system to carry out a method according to the invention.

In a further aspect of the invention, a computer system is provided, which comprises a host computer, which comprises a processor, a main memory, a display, a human input device, and a non-volatile memory, in particular a hard disk or a solid-state disk. The non-volatile memory comprises instructions that, when executed by the processor, cause the computer system to carry out a method according to the invention.

The processor may be a general-purpose microprocessor that is customarily used as the central processing unit of a personal computer, or it may comprise one or a plurality of processing elements configured to carry out specific calculations, such as a graphics processing unit. In alternative embodiments of the invention, the processor may be replaced or complemented by a programmable logic device, such as a field-programmable gate array (FPGA), which is configured to provide a defined set of operations, and/or may comprise an IP core microprocessor.

Figure 1:
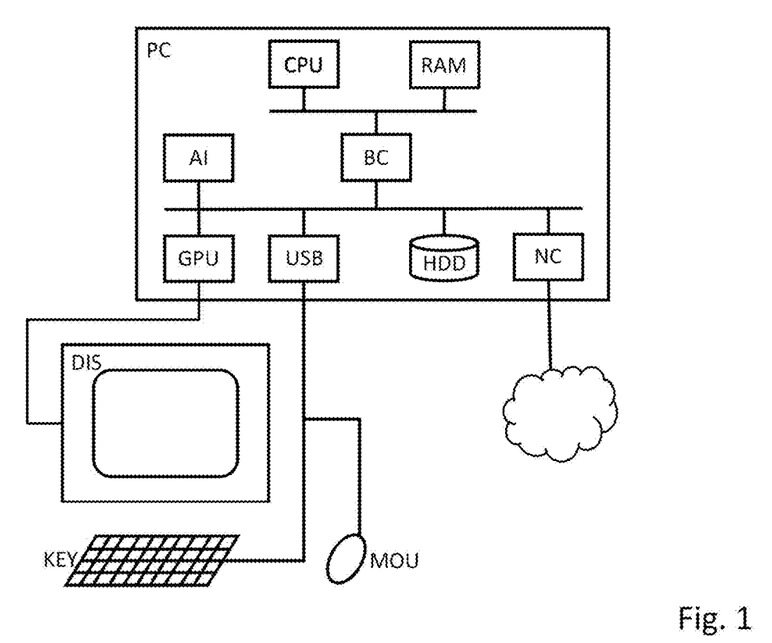
FIG. 1 is an exemplary diagram of a computer system.

FIG. 1 illustrates an exemplary embodiment of a computer system.

The embodiment shown comprises a host computer PC having a display DIS and human interface devices such as a keyboard KEY and a mouse MOU; furthermore, an external server may be connected via a network, as indicated by a cloud symbol.

The host computer PC comprises at least one processor CPU having one or multiple cores, a main memory RAM, and a number of devices connected to a local bus (such as PCI Express), which exchanges data with the CPU via a bus controller BC. The devices comprise e.g., a graphics processing unit GPU for driving the display, a controller USB for attaching peripherals, a non-volatile memory HDD such as a hard disk or a solid-state disk, and a network interface NC. Additionally, the host computer may comprise a dedicated accelerator AI for neural networks. The accelerator may be implemented as a programmable logic device such as an FPGA, as a graphics processing unit suitable for general calculations, or as an application-specific integrated circuit. Preferably, the non-volatile memory comprises instructions that, when executed by one or more cores of the processor CPU, cause the computer system to carry out a method according to the invention.

In alternative embodiments, indicated as a cloud in the figure, the host computer may comprise one or more servers comprising one or more processing elements, the servers being connected, via a network, to a client comprising a display device and an input device. Thus, the annotation environment may be executed partially or completely on a remote server, such as in a cloud computing setup. A personal computer may be used as a client which comprises a display device and an input device via a network. Alternatively, a graphical user interface of the annotation environment may be displayed on a portable computer system, in particular a smartphone or a tablet having a touchscreen user interface.

Figure 2:
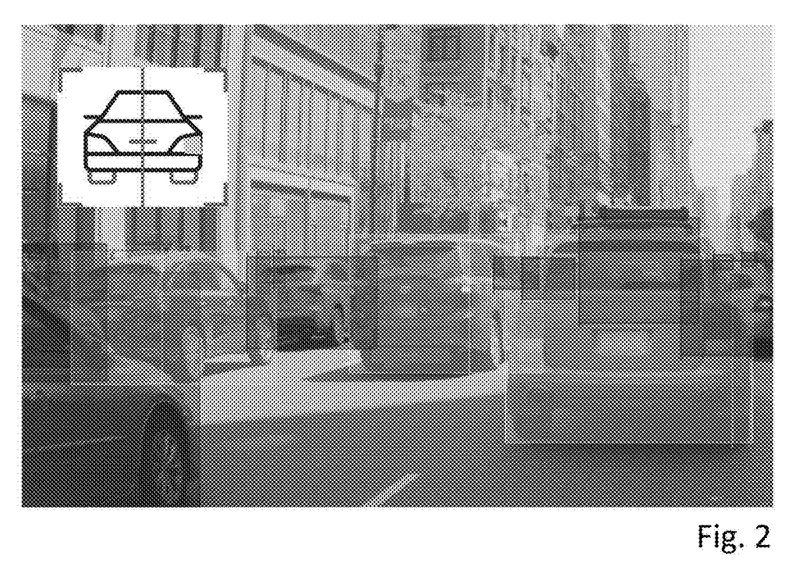
FIG. 2 is an example of a video frame with a schematic diagram of possible data points in the top left inset.

FIG. 2 displays an exemplary video frame with a schematic diagram of possible data points in the top left inset.

The figure displays a photo or a frame of a city scene. Such a frame may be part of a video recording. Generally, a recording provided by a customer may be video or sound data representing a sequential context, such as 5 minutes of driving recorded via a cam and a LiDAR sensor, or a 10-minute voice recording. Video recordings, for example, might consist of a series of consecutive frames which again capture a series of objects. The neural network processes the recording to produce annotations that may comprise a plurality of data points, each data point describing one specific aspect.

A data point is a parameter describing a certain characteristic of a recording and can be applied to all levels of detail. Levels of detail may be the entire recording, a series of consecutive or random frames, a single frame, or an object in a frame. A specific example would be an annotation for a car, consisting of a bounding box describing the position of the car to within a certain precision, a vertical line marking the edge of the car, a classification to describe the type of the car, attributes for truncation and occlusion, blinkers, brake lights, color, and so on. Data points may be classes, boxes, segments, polygons, polylines, attributes like blinkers, brake lights, colors, subclasses, tracking information, degree of occlusion, degree of truncation, complex classes describing the relevance of an object/frame/clip, sound, text, sentiment, or any other information that can be determined in an automated manner.

In the inset on the top left of the figure, different data points for a car are visualized. Cars may be of different types, e.g., a van, an SUV, or a sports car. The position or rather the dimensions of a car are generally indicated by a bounding box, i.e., a rectangular box or cuboid that encloses the car. Vertical lines indicate the boundaries of the car. A further possible data point for a car is the activation of a light indicator, such as the turn signal shown in the inset.

A plurality of cars are present in the frame, each being enclosed by a bounding box. Cars may be entirely visible, such as the one driving directly in front of the camera, or they may be occluded. The traffic density of the city scene may negatively impact the annotation quality, e.g., by rendering an exact determination of the borders of the bounding box difficult due to occlusion.

Figure 3:
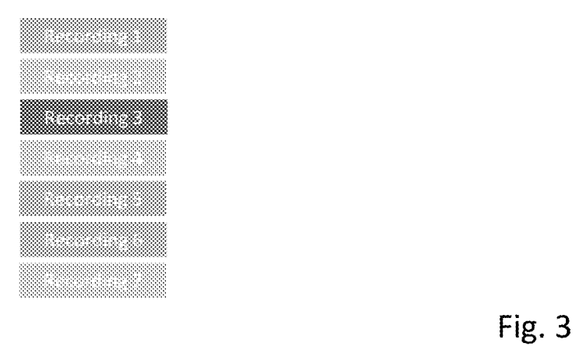
FIG. 3 is a schematic diagram of an exemplary packet of video frames.

FIG. 3 displays a schematic diagram of an exemplary packet of video frames.

A common way to produce sensor data for training or validating an autonomous vehicle is to have a test driver drive around while recording all sensor data of interest, such as camera data, LiDAR data, and/or GPS data. The data is unsorted, so a first recording (Recording 1) may have been captured in broad daylight on a highway, whereas the next recording (Recording 2) may have been captured also in the daytime but during a rain shower. The next recording (Recording 3) may have been captured at night. In subsequent recordings, the environment conditions may change in an unpredictable manner.

Figure 4:
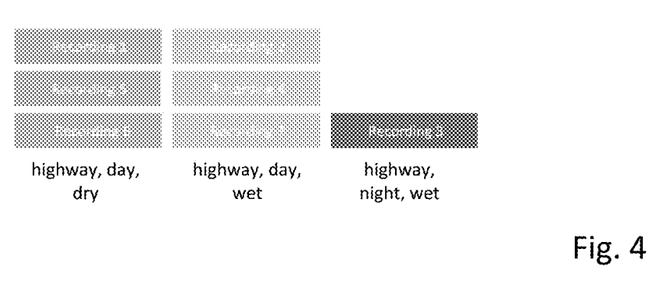
FIG. 4 is a schematic diagram of an exemplary packet of video frames grouped according to a time of day and weather indication.

FIG. 4 displays a schematic diagram of an exemplary packet of video frames grouped according to an additional time of day and weather indication. Because the visibility of an object is highly dependent on the time of day and weather conditions, the quality of annotation for an object detector will correlate with these environment conditions.

It is advantageous to group the recorded frames into packets or clusters according to time of day and weather conditions. In the example shown, Recordings 1, 5, and 6 were recorded on a dry day, whereas Recordings 2, 4, and 7 were recorded on a day when it was wet due to rainy weather. Recording 4 was recorded under wet conditions at night.

Further criteria could be used for grouping recorded frames in packets or clusters. As an example within the context of autonomous driving, customer-provided data may be clustered not only on the basis of day/night and wet/dry, but also on the basis of street type, e.g., city road vs. highway.

Frames recorded during similar environment conditions are processed together to provide groups of frames with uniform annotation quality. In an embodiment, different neural networks may be applied for annotating the frames on the basis of at least one environment condition that was existent when the frame in question was being recorded.

Figure 5:
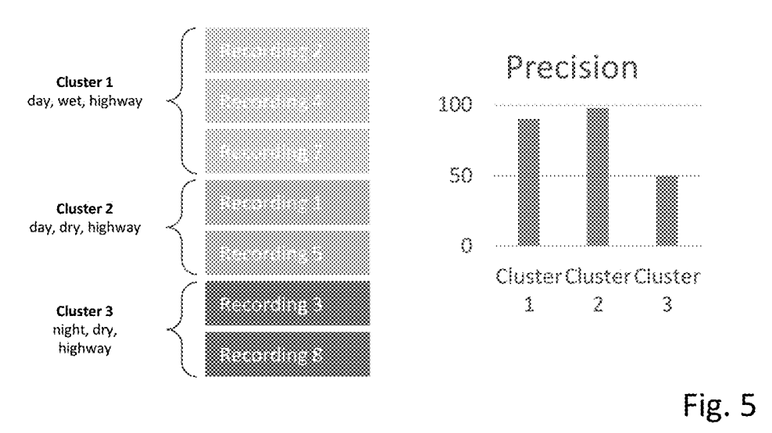
FIG. 5 is an exemplary diagram illustrating the correlation between environment conditions and quality of the annotations.

FIG. 5 displays an exemplary diagram illustrating the correlation between environment conditions and quality of the annotations.

A first group of frames, Cluster 1 comprising Recordings 2, 4, and 7, was recorded on a rainy or wet day. Based on a manual quality check, the precision of Cluster 1 is close to 90%. Thus, the annotations still need to be checked, but the neural network may produce sufficiently precise data after just a few retraining iterations.

A second group of frames, Cluster 2 comprising Recordings 1 and 5, was recorded on a dry day. Based on a manual quality check, the precision of Cluster 2 is 99%. As this is sufficiently precise, quality checks for groups of frames recorded under the same environment conditions can be skipped entirely.

A third group of frames, Cluster 3 comprising Recordings 3 and 8, was recorded on a dry night. Based on a manual quality check, the precision of Cluster 3 is 50% and thus clearly unacceptable. Frames recorded under the same environment conditions need extensive manual checks and an improved training of the neural network.

Because the frames have been grouped according to environment conditions, human effort is spent on those groups of frames where it is most needed. Frames captured under favorable conditions can be processed fully automatically. In addition, the computing power or energy required to retrain a neural network is applied where it has a noticeable impact on the quality of the annotations.

Figure 6:
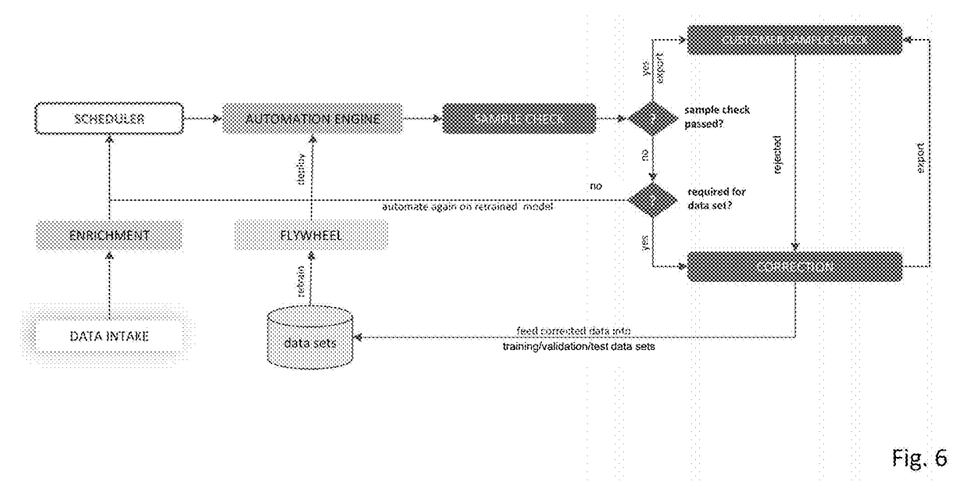
FIG. 6 is a schematic diagram of an automation system performing a method according to the invention.

FIG. 6 is a schematic diagram of an automation system performing a method according to the invention. The automation system implements different steps of the method in dedicated components and is well adapted for execution in a cloud computing environment.

In a first step, "Data Intake," unsorted recordings are received from a customer. The recordings can be normalized, e.g., split into frames, to allow for a uniform processing.

In a second step, "Enrichment," the frames from the recordings are analyzed and automatically enriched with metadata that is relevant to measure automation quality. This step is shown a precondition for automation but in alternative embodiments and depending on the desired metadata, enrichment could also be performed after automation on the basis of information gathered during annotation like traffic density or distance of the object to the sensor, for example. In the context of autonomous driving, metadata or condition attributes relevant for the annotation quality could be a geographic location, a weather condition, a street type, light conditions, and/or a time of day. For efficiency of automation, it is useful to process one group of frames its entirety in the following steps. For projects with interleaved recording and processing of frames, it may be advantageous to add frames recorded in the same environment conditions until a predetermined cluster size is reached before continuing with the further processing steps. Thus, Enrichment and Clustering comprise technologies for adding static or dynamic metadata to recordings, as well as technologies for inserting single recordings into bigger clusters of a definable size on the basis of the metadata enrichment.

In a third step, "Scheduler," different groups of frames are scheduled for annotation by an automation engine that runs one or more automation components for annotating the frames using one or more data points. The scheduler selects the group of frames for processing on the basis of the availability of new versions of automation components. An automation component may produce a single data point, for instance a vertical line or a number of related data points such as a bounding box and an object class. Automation components may be neural networks or any other type of machine learning-based technology which learns from data samples in a supervised, semi-supervised, or unsupervised way.

In a fourth step, "Automation Engine," a group of frames is processed by at least one automation components that assigns data points to the frames. The automation system produces any type of data point via automation components. Automation components are a central part of the workflow of the annotation system. Preferably, data points carry metadata which precisely describes the version of the automation component which was used to produce the result. The automation engine comprises technologies for precisely storing relevant metadata about automation components.

In a fifth step, "Sample Check," a sample of frames is selected for quality control. In quality control, a human annotator may be shown the frame with corresponding annotations such as a bounding box and may be asked whether the bounding box is correct. Alternatively, they may be shown a user interface for adjusting the bounding box and/or adding a bounding box in the event that an object was missed by the neural network. From the type and number of corrections made by the human annotator, the automation system determines a quality measure.

In a sixth step, "Sample check passed?," the system determines whether the annotation quality or the quality measure is above a predefined threshold. If the automation system finds that this is the case ("yes"), the group of frames comprising the selected sample is exported and delivered to the customer. If at least one group of frames recorded in a specific set of environment conditions passes the sample check, the automation system may decide that the quality of annotations for all groups of frames with the same environment conditions can be exported without further quality checks and thus that steps five and six can be bypassed. In an embodiment, the automation system may count the number of groups with those environment conditions that had a sufficient annotation quality and may bypass the sample check as soon as a predefined number of groups has passed the sample check. If the automation system finds that the group of frames has not passed the sample check ("no"), execution continues at an eighth step, in which the automation system ascertains whether frames recorded in the environment conditions of the selected sample are necessary for the data set. Whether this is the case may depend on the number of frames that were recorded in the same conditions and have already been used for training the model. If a sufficient number of frames have already been used for training, the group of frames may simply be inserted into the third step, "Scheduler," to be processed anew as soon as a retrained neural network is available.

In a seventh step, "Customer Sample Check," the customer may check a sample of the exported frames to ensure that the annotations adhere to their specifications and requested annotation quality. If the customer rejects the group of frames, a sample or the entire group of frames is processed manually in the step "Correction." Preferably, the automation system enforces sample checks for all subsequent groups with the same environment conditions until a new group of frames has passed the sample check in the sixth step and/or the customer sample check in the seventh step.

In a ninth step, "Correction," a manual annotation is performed on the sample of frames that did not pass the test or on a sample or the entirety of the group of frames rejected by the customer. The manually annotated frames are exported and delivered to the client for the seventh step, customer sample check. The manually annotated frames are also used for retraining the neural network by feeding the corrected data into the training, validation, or test data sets. These data sets are symbolized by a cylinder.

In a tenth step, "Flywheel," the at least one neural network or automation component that produced the data points rejected in the sample check is retrained. By retraining the neural network, the automation quality is improved. Preferably, the automation components are improved to a level where no manual investigation is needed for as many metadata clusters (i.e., frames recorded in a specific set of environment conditions) as possible. Iteration times for the retraining need to be as short as possible to enable rapid improvements of the efficiency.

Flywheel comprises technologies for efficiently storing training data sets for each automation component (data point), in order to monitor training data set changes and automatically trigger retrainings as soon as predefined or automatically determined thresholds of training set changes are detected. Furthermore Flywheel comprises technologies for automatically deploying retrained models into automation components and for notifying the scheduler about version changes.

When new data is recorded at the same time as frame annotation, or in a manner interleaved therewith, an additional step of targeted data capture may be performed. Automation components are improved through many training iterations on a data set that is constantly being refined, thereby representing real-world variance better and better over time. Confidence levels per metadata cluster enable a systematic approach to collect exactly those data samples where automation results are suffering the most. Referring to FIG. 5, the frames of Cluster 3 were recorded at night and automatic annotation currently results in unacceptable annotation quality. As soon as this is discovered in the sample check step, a targeted data capture may be requested, in which night samples are recorded specifically for improving the training data set of the automation component under this environment condition.

In a preferred embodiment, the level and volume of additional training data of a specific type (cluster) are determined depending on the confidence. Any data recorded in the same conditions can be used for retraining. As soon as wrongly annotated frames are corrected, they will be fed directly into the training set of the specific automation component. However, usually not all data for a specific cluster and data point needs to get corrected manually. Instead, only samples up to the next retraining threshold level are collected and corrected. The rest of the data is automatically scheduled for a rerun with a higher version of the automation component. Targeted data capture comprises technologies for selecting samples of interest on the basis of metadata clusters up to predefined quantities for manual correction. Furthermore it preferably comprises technologies for flagging samples of bad quality which are not needed for retraining for automation runs on higher versions of the automation component in question.

By using the correlation between the environment conditions in which a frame was recorded and the resulting quality of the annotations, the method according to the invention makes it possible to apply manual work specifically for the rapid improvement of neural networks, which are then used to produce automatic annotations for delivery to the customer, and thus it significantly speeds up larger annotation projects necessary for, e.g., validation.

Those skilled in the art will appreciate that the order of at least some of the steps of the method according to the invention may be changed without departing from the principles of the invention. While the present invention has been described with respect to a limited number of embodiments, those skilled in the art will be aware of numerous modifications and variations thereof. It is intended that the appended claims cover all such modifications and variations as fall within the scope of the claim language.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for automatically annotating frames of sensor data, the method comprising:
receiving the frames of sensor data;
grouping the frames into a plurality of packets based on at least one condition attribute, wherein the at least one condition attribute describes at least one environment condition that existed while a respective frame of sensor data was being recorded;
annotating frames from a first packet using a neural network, wherein the annotating comprises assigning at least one data point to each frame, wherein the first packet comprises frames for which the at least one condition attribute is in a selected value range;

selecting a first sample of one or more frames from the first packet and determining a quality measure for data points of the first sample; and ascertaining that the quality measure for the first sample is below a predefined threshold;

wherein based on having ascertained that the quality measure for the first sample is below the predefined threshold, the method further comprises:

receiving corrected annotations for frames in the first sample;

retraining the neural network based on the frames in the first sample;

selecting a second sample of one or more frames from the frames of the first packet that were not included in the first sample;

annotating frames of the second sample using the retrained neural network and determining a quality measure for data points of the second sample;

ascertaining that the quality measure for the second sample is above the predefined threshold; and based on having ascertained that the quality measure for the second sample is above the predefined threshold, annotating the remaining frames of the first packet using the retrained neural network and exporting the annotated frames of the first packet without any further subsequent determinations of quality measures of any additional samples of the first packet.

2. The method according to claim 1, wherein for frames of image data the at least one condition attribute comprises a geographic location, a time of day, a weather condition, a visibility condition, a road type, a distance to an object, and/or a traffic density; and/or wherein for audio frames the at least one condition attribute comprises a geographic location, a gender and/or an age of a speaker, a room size, and/or a measure of background noise.

3. The method according to claim 1, wherein receiving the frames of sensor data comprises:

preprocessing the frames, wherein at least one respective condition attribute for a respective frame is determined by a dedicated neural network based on the respective frame, and/or wherein at least one respective condition attribute for a respective frame is determined based on additional sensor data recorded concurrently with the frames.

4. The method according to claim 1, wherein for an image frame the at least one data point comprises a position of an object, a class of an object, a position of an edge of a bounding box, a correlation of an object in the image frame with an object in a preceding or subsequent image frame, and/or an activation of a light indicator; and/or wherein for an audio frame the at least one data point comprises one or more words of text recognized from the audio frame.

5. The method according to claim 1, wherein the first sample comprises two or more frames selected from the first packet, and wherein upon ascertaining that the quality measure for the first sample is below the predefined threshold, no further calculations are performed on the frames from the first packet until corrected annotations are received for the frames in the first sample.

6. The method according to claim 1, wherein the choice of frames for the first sample depends on data points for which the quality measure is to be determined, in particular a random choice of single frames for object detection and/or a random choice of batches of consecutive frames for object tracking.

7. The method according to claim 1, wherein the steps of selecting a current sample of one or more frames from the first packet and determining a quality measure for data points of the current sample, as well as receiving corrected annotations for frames in the current sample, and retraining the neural network based on the frames in the current sample, are repeated until a quality measure for the current sample is above the predefined threshold or the first packet does not comprise any remaining frames.

8. The method according to claim 1, wherein annotating sensor data and recording sensor data are performed alternately or simultaneously, and wherein based on ascertaining that the quality measure for at least one frame in the first sample is below a predefined threshold, the method further comprises:

requesting the recording of additional sensor data for which the at least one condition attribute is in the selected value range of the first packet.

9. A method for automatically annotating sensor data, the method being executed by at least one processor of a host computer, the method comprising:

receiving frames of sensor data;

grouping the frames in packets based on at least one condition attribute, wherein the at least one condition attribute describes at least one environment condition that existed while a respective frame of sensor data was being recorded;

annotating frames from a first packet using a neural network, wherein the annotating comprises assigning at least one data point to each frame, wherein the first packet comprises frames for which the at least one condition attribute is in a selected value range;

selecting a first sample of one or more frames from the first packet and determining a quality measure for data points of the first sample;

ascertaining that the quality measure for the first sample is below a predefined threshold;

receiving corrected annotations for the frames in the first sample and retraining the neural network using the frames in the first sample;

annotating at least one of the remaining frames of the first packet using the retrained neural network;

selecting a second sample of one or more frames out of the at least one annotated remaining frame of the first packet and determining a quality measure for data points of the second sample;

ascertaining that the quality measure for the second sample is above the predefined threshold; and based on having ascertained that the quality measure for the second sample is above the predefined threshold, annotating the remaining frames from the first packet using the retrained neural network, and exporting the annotated frames without any further subsequent determinations of quality measures of any additional samples of the first packet.

10. A non-transitory computer-readable medium having processor-executable instructions stored thereon for automatically annotating frames of sensor data, wherein the processor-executable instructions, when executed, facilitate performance of the following:

receiving the frames of sensor data;

grouping the frames into a plurality of packets based on at least one condition attribute, wherein the at least one condition attribute describes at least one environment condition that existed while a respective frame of sensor data was being recorded;

annotating frames from a first packet using a neural network, wherein the annotating comprises assigning at least one data point to each frame, wherein the first packet comprises frames for which the at least one condition attribute is in a selected value range;

selecting a first sample of one or more frames from the first packet and determining a quality measure for data points of the first sample; and ascertaining that the quality measure for the first sample is below a predefined threshold;

wherein the processor-executable instructions, when executed, further facilitate performance of the following based on having ascertained that the quality measure for the first sample is below the predefined threshold:

receiving corrected annotations for frames in the first sample;

retraining the neural network based on the frames in the first sample;

selecting a second sample of one or more frames from the frames of the first packet that were not included in the first sample;

annotating frames of the second sample using the retrained neural network and determining a quality measure for data points of the second sample;

ascertaining that the quality measure for the second sample is above the predefined threshold; and based on having ascertained that the quality measure for the second sample is above the predefined threshold, annotating the remaining frames of the first packet using the retrained neural network, and exporting the annotated frames of the first packet without any further subsequent determinations of quality measures of any additional samples of the first packet.

* * * * *